July 24, 1962  G. PREIS  3,045,514
REAMING TOOL FOR CYLINDRICAL BORES
Filed July 29, 1960  2 Sheets-Sheet 1
Fig. 1
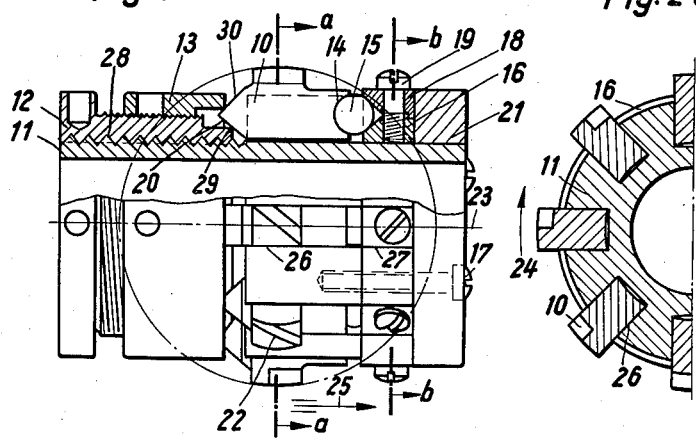
Fig. 2a
Fig. 2b
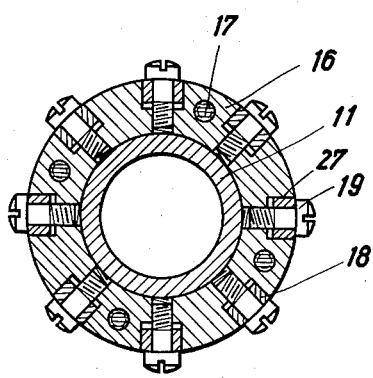
Fig. 6
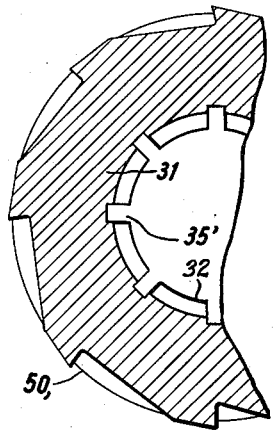
Inventor:
Georg Preis

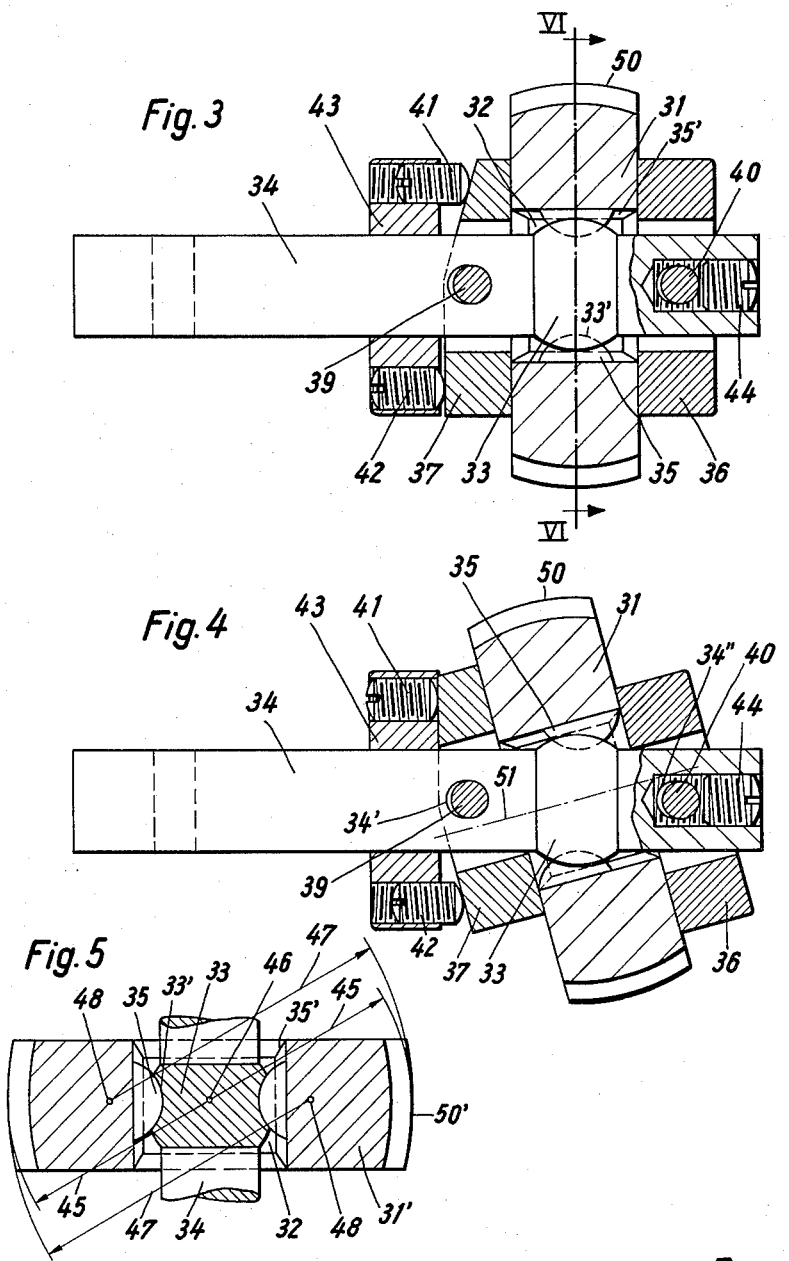

United States Patent Office 3,045,514
Patented July 24, 1962

3,045,514
REAMING TOOL FOR CYLINDRICAL BORES
Georg Preis, Marburger Str. 12, Berlin W 30, Germany
Filed July 29, 1960, Ser. No. 46,294
11 Claims. (Cl. 77—75)

This application is a continuation-in-part of my application Serial No. 637,134, filed January 30, 1957, now abandoned.

My present invention relates to a reaming tool for cylindrical bores in which an elongated holder carries a substantial number of cutting teeth of generally arcuate configuration.

The invention has for its main object the provision of a tool of this character whose cutting teeth afford a cleaner cut than is possible with conventional reaming tools. Another object is to provide means for conveniently adjusting all of these teeth in a manner adapting the tool to different diameters and/or rendering different teeth or tooth portions effective to do the cutting.

I have found, in accordance with an important feature of this invention, that a cleaner cut is produced if some or all of the teeth on the holder are positioned to lie in planes which are inclined relatively to the holder axis so that their edges extend along helicoidal lines around this axis. The resulting oblique cut produces a smother surface since the tool encounters less resistance than does a cutter with straight teeth, given the same depth of cut in each case.

Advantageously, in accordance with another feature of my invention, the teeth have arcuate cutting edges, lying on the periphery of a sphere whose diameter substantially equals that of the bore to be reamed, and are disposed in a radial array on the holder which is provided with means for varying simultaneously the position of all of these teeth relative to the holder axis. The teeth may, for this purpose, be provided in a generally spherical cutter which is bodily pivotable on the holder so that its axis can be inclined at various angles to the holder axis. The invention also provides simple and effective means for locking the cutter in a selected position.

The above and other objects and features of my invention will become more fully apparent from the following description of certain embodiments, reference being made to the accompanying drawing in which:

FIG. 1 is a side-elevational view, partly in longitudinal section, of a reamer embodying my invention;

FIGS. 2a and 2b are cross-sectional views taken respectively on lines a—a and b—b of FIG. 1;

FIG. 3 is an elevational view, partly in section, of another reamer according to the invention having cutting edges extending substantially along a spherical surface;

FIG. 4 is a view similar to FIG. 3, showing the reamer in a different position of adjustment;

FIG. 5 is a fragmentary view of a modified reamer generally similar to that of FIGS. 3 and 4; and FIG. 6 is a cross-sectional view taken on the line VI—VI of FIG. 3.

The reamer shown in FIGS. 1, 2a and 2b comprises a generally cylindrical holder 11 around whose periphery four pairs of diametrically opposite, radially extending teeth 10 are adjustably positioned in a symmetrical array. The rear shanks of the teeth 10 have hemispherical recesses 14 receiving respective balls 15 which form fulcra for pivotal outward movement of the teeth in longitudinal grooves 26 of holder 11. The front portions of the teeth are provided with an inner bevel 20 and with an outer bevel 30 respectively engaged by an edge 29 of an inner pressure ring 12 and a similar edge of an outer pressure ring 13. Inner ring 12 is screwed onto holder 11 by means of threads 28 and is in similar threaded engagement with outer ring 13 whereby the two rings can be rotated independently of each other to change the inclination of the teeth and relatively to the holder axis 23.

A collar 21 is secured by means of bolts 17 to the holder 11, together with a stationary ring 16 which forms an inner abutment for the balls 15. Ring 16 is provided with a series of longitudinal grooves 27, aligned with respective grooves 26, in which beveled blocks 18 are clamped by means of screws 19 so as to wedge the balls 15 between themselves and an oppositely beveled face of ring 16.

The cutting edges 22 of the teeth 10 are arcuate and, as clearly seen in FIG. 1, extend along helicoidal lines around the axis 23. The pitch of these helicoidal cutting edges is right-handed, corresponding to clockwise rotation as viewed in FIG. 2a (arrow 24) when the tool is moved from left to right in FIG. 1 (arrow 25). By this motion the chips are peeled from the bore in a direction opposite to the sense of feed.

In the position illustrated in FIG. 1, the cutting edges 22 lie on the surface of a sphere whose diameter equals the average diameter of the bore to be produced. The tool will thus center itself automatically and its action will be independent of the degree of precision with which it is guided into the bore. Normally, such guidance will be provided by the shaft of a drill press or a milling machine, not shown, inserted into the bore of holder 11.

If the diameter of the bore is to be enlarged, the outer pressure ring 13 is retracted and the inner pressure ring 12 is advanced to tilt the array of teeth 10 outwardly around the balls 15. When the desired inclination has been reached, the ring 13 is again brought into contact with beveled tooth face 30 and tightened thereagainst to lock the teeth in their new position. An inverse sequence of steps is observed when the diameter is to be reduced.

In FIGS. 3, 4 and 6 I have shown a tool whose elongated holder 34 carries a cutter 31 having a series of radial teeth 50 again constituting an array similar to that of the preceding embodiment, the cutting edges of these teeth extending substantially along helicoidal lines on a spherical surface. Holder 34 is provided with an annular convexity 33 formed with a pair of diametrically opposite radial flutes 33' of segmental configuration. Aligned with these flutes are a pair of axially extending grooves 35' formed on the inner periphery 32 of the annular cutter 31, there being as many such grooves (e.g. eight) as are teeth 50 on the outer periphery of the cutter. Two segmental disk tongues 35 are lodged in the flutes 33' and in the grooves 35' aligned therewith, these disk tongues forming a pivotal connection between the cutter 31 and the holder 34 whereby the former may be inclined about the latter as illustrated in FIG. 4.

In order to secure the cutter 31 in any desired angular position on the holder 34, I provide on the holder a pair of clamping rings 36, 37 which are pivotally held thereon, by means of pins 39 and 40, on opposite sides of the cutter 31. The pins 39, 40 are lodged in slightly elongated holes 34', 34" so as to be displaceable along the holder axis to a limited extent; this affords the necessary play for the adjustment of the cutter. The clamping rings 36, 37 are themselves placed under pressure with the aid of two set screws 41, 42, threadedly inserted into a fixed collar 43 on holder 34, and a further set screw 44 threadedly engaging an axial bore of the holder so as to bear upon pin 40.

The clamping ring 37 is wedge-shaped over half of its periphery so as to present a beveled face to the set screw 41; this beveled face comes to rest against the collar 43 when the cutter 31 is in the tilted position of FIG. 4. In this position the screw 41 is retracted and the screw 42 is moved out to bear upon the transverse face of ring 37. Upon a loosening of screw 44 and a withdrawal of screw 42, the cutter 31 may be brought into the position of FIG. 3 whereupon the screws 41, 42 and 44 are to be readjusted to hold it in place.

It will be apparent that in the position of FIG. 3 the tool operates in the manner of a conventional reamer, the plane of symmetry of its array of teeth then coinciding with the plane of rotation 38 of the cutter; under these circumstances the cutting will be effected by the central portions of all the teeth 50. If, however, the cutter is tilted into the position shown in FIG. 4, certain of its teeth (those visible in FIG. 4) will cut near the ends of their edges while others (those standing at right angles thereto) will be effective at their centers. All teeth, however, occupy positions inclined to the cutter axis 51 in FIG. 4, their edges thus extending along helicoidal lines in generally the same manner as do the edges 22 of the teeth 10 in the preceding embodiment. Thus, the tool will operate with an oblique cut.

The provision of a plurality of pairs of grooves 35' will enable the cutter 31 to be rotated, upon its disassembly from the holder, into a position into which a different pair of teeth 50 will subsequently occupy the position shown in FIG. 4. In this manner all the teeth may be selectively positioned so as to cut with different edge portions, thereby insuring uniform wear.

In FIG. 5 the holder 34 is shown provided with a modified cutter 31' whose teeth 50' have their edges so curved that the centers of curvature 48 thereof lie beyond the center 46 of the cutter, their radii 47 being thus greater than the cutter radius 45. With this arrangement the teeth whose axes are farthest from the plane 38 will have the largest effective diameters so that adjustment of the cutter from the position of FIG. 3 to that of FIG. 4, or to some intermediate position, will vary the size of the hole to be reamed. It will be apparent that all the centers of curvature 48 lie on a circle centered on the point 46.

What I claim is:

1. A reaming tool for cylindrical bores, comprising an elongated holder, a generally spherical cutter tiltably mounted on said holder and integrally provided with a radial array of teeth, said array consisting of a plurality of peripherally spaced pairs of diametrically opposite teeth having arcuate cutting edges extending substantially along a spherical surface, and adjusting means on said holder bearing upon said cutter for selectively inclining the axis of said cutter with respect to that of said holder.

2. A reaming tool according to claim 1 wherein said adjusting means comprises a pair of clamping rings pivotally mounted on said holder with freedom of limited relative axial displacement, said cutter being annular and positioned between said clamping rings, and a plurality of setscrews on said holder engageable with one of said clamping rings at diametrically opposite locations for urging it against said cutter and the other clamping ring in a selected pivotal position.

3. A reaming tool according to claim 2 wherein said holder is provided with an annular support for said setscrews adjacent said one clamping ring, said one clamping ring being provided with a beveled face adapted to lie flat against said support in an inclined position of said one clamping ring.

4. A reaming tool according to claim 2 wherein said cutter is internally provided with a pair of inwardly projecting disk tongues lying diametrically opposite each other in a common axial plane, said holder being provided with an annular convexity having a pair of diametrically opposite radial flutes slidably receiving said tongues as a pivotal support for said cutter, said flutes lying in an axial plane transverse to the pivotal axes of said clamping rings.

5. A reaming tool according to claim 4 wherein said cutter is internally provided with a plurality of pairs of diametrically opposite, axially extending grooves adapted to receive said disk tongues, thereby enabling said cutter to be pivotally mounted on said holder in a plurality of relatively rotated positions.

6. A reaming tool according to claim 1 wherein said edges have a radius of curvature exceeding the maximum radius of said array.

7. A reaming tool for cylindrical bores, comprising an elongated holder, a generally spherical cutter tiltably mounted on said holder provided with a plurality of peripherally spaced pairs of diametrically opposite teeth forming a radial array, each of said teeth having an arcuate cutting edge extending along generally helicoidal lines on a sphere fitting in the bore to be reamed, and adjusting means on said holder bearing upon said cutter for selectively inclining the axis of said cutter with respect to that of said holder.

8. In a reaming tool, in combination, a radial array of cutting teeth with arcuate edges, said array consisting of a plurality of peripherally spaced pairs of diametrically opposite teeth having arcuate cutting edges extending along generally helicoidal lines on a spherical surface, a generally cylindrical holder for said teeth, supporting means for said teeth pivotally mounted on said holder, and screw-threaded pressure means on said holder applying pressure upon said supporting means at a location offset from the pivotal axis thereof, said pressure means being adjustable for simultaneously varying the positioning of all of said teeth on said holder.

9. The combination according to claim 8 wherein said supporting means is provided with a wedge-shaped formation engaged by said screw-threaded means.

10. In a reaming tool, in combination, a generally cylindrical holder, at least one pair of diametrically opposite cutting teeth on said holder, said teeth being provided with arcuate edges, mounting means supporting each of said teeth on said holder with freedom of pivotal movement in an axial plane of said holder about an axis offset from the center of curvature of its edge, and adjustable fastening means for selectively immobilizing said teeth in different pivotal positions, thereby varying the effective cutting diameter of said teeth.

11. A reaming tool for cylindrical bores, comprising an elongated holder, and a radial array of cutting teeth on said holder, said teeth having arcuate cutting edges extending substantially along a spherical surface fitting in the bore to be reamed, the edges of said teeth extending along generally helicoidal lines around the axis of said holder.

References Cited in the file of this patent

UNITED STATES PATENTS

| | | |
|---|---|---|
| 13,357 | Keeney | July 31, 1855 |
| 207,810 | Kean et al. | Sept. 10, 1878 |
| 621,915 | Fosby | Mar. 28, 1899 |
| 682,810 | Parks | Sept. 17, 1901 |
| 1,032,682 | Karpa | July 16, 1912 |
| 1,096,799 | Weeks | May 12, 1914 |